United States Patent [19]
Nishitani

[11] Patent Number: 5,862,473
[45] Date of Patent: Jan. 19, 1999

[54] RELAY APPARATUS FOR PAGERS

[75] Inventor: Shuji Nishitani, Kyoto, Japan

[73] Assignee: Rohm Co. Ltd., Kyoto, Japan

[21] Appl. No.: 649,849

[22] Filed: May 7, 1996

[30]  Foreign Application Priority Data

May 10, 1995 [JP] Japan .................................. 7-111959

[51] Int. Cl.⁶ ................................................... H04Q 7/18
[52] U.S. Cl. ...................... 455/412; 455/31.2; 379/88.15
[58] Field of Search ........................ 340/825.44; 379/57,
379/56, 210, 211, 212, 67, 74, 77, 88.13,
88.15; 455/38.1, 31.2, 412, 417

[56]  References Cited

U.S. PATENT DOCUMENTS

| | | | |
|---|---|---|---|
| 4,941,203 | 7/1990 | Patsiokas et al. | 379/77 |
| 4,942,598 | 7/1990 | Davis | 379/88.15 |
| 5,144,648 | 9/1992 | Bhagat et al. | 455/31.2 |
| 5,375,161 | 12/1994 | Fuller et al. | 455/417 |
| 5,412,719 | 5/1995 | Hamamoto et al. | 340/825.44 |
| 5,438,616 | 8/1995 | Peoples | 379/210 |
| 5,502,761 | 3/1996 | Duncan et al. | 455/412 |
| 5,761,271 | 1/1998 | Karnowski | 379/88.15 |

*Primary Examiner*—Dwayne D. Bost
*Assistant Examiner*—Myron K. Wyche
*Attorney, Agent, or Firm*—Nikaido Marmelstein Murray & Oram LLP

[57]  ABSTRACT

A relay apparatus requests entry of a pager number of a person, when the person either accessed a pager through dialing or accessed the relay apparatus through a telephone line. If the pager number is successfully recognized, the relay apparatus informs the person who made the access of the state of messages stored corresponding to the recognized pager number, and requests instruction for a next operation through the telephone line. If replaying is instructed, a stored message is replayed. If recording is instructed, a message of the person who made the access is recorded to a storage box for a person addressed, and a pager of the person addressed is called up afterwards. The relay apparatus operates in a similar way when the person addressed makes an access.

6 Claims, 2 Drawing Sheets

5,862,473

RELAY APPARATUS FOR PAGERS

BACKGROUND OF THE INVENTION

1. Field of the Invention

The present invention relates to a relay apparatus for pagers.

2. Description of the Prior Art

NTT (Nippon Telegraph and Telephone Company) and other communication companies are already providing services of a so-called "voice mail" (a "message-leaving dial" service). A user of this service, who carries a pager terminal, has to perform the following steps in order to establish a communication with another person when the user is outdoors. As an example, descriptions are given below as to the case where a person "A" (hereinafter referred to as "A") sends a message to a person "B" (hereinafter referred to as "B"), and then "B", having received the message, returns a message to "A".

As the first step, "A" records a voice message addressed to "B". Next, as the second step, "A" calls up a pager terminal that "B" carries. Then, as the third step, "B" receives a call from "A". As the fourth step, "B" listens to the voice message from "A", and, according to the message, "B" records a voice message addressed to "A" as a "voice mail". As the fifth step, "B" calls up a pager terminal that "A" carries. As the sixth step, "A" receives a call from "B". As the seventh step, "A" listens to the voice message from "B".

It is to be noted that a user is requested to enter a secret number in the second step for security reasons. It is also to be noted that a pager terminal number is usually the same as the telephone number used for calling up the pager terminal.

However, the conventional voice communication system as described above is defective because a user is billed for telephone charges in the first, second, fourth, fifth and seventh steps, and because "A" has to dial three times and "B" has to dial twice at their respective telephone set.

SUMMARY OF THE INVENTION

An object of the present invention is to provide a relay apparatus that saves time and charges by reducing the number of necessary dialing sessions.

A relay apparatus of the present invention is provided with: an interface circuit for interfacing with a telephone line; a tone detection circuit for determining a tone input through the interface circuit; a recording means for recording a voice message input through the interface circuit; a voice guidance circuit for storing the number of messages stored in the recording means and for outputting the number by voice; a voice switching circuit for outputting alternatively either an output from the recording means or an output from the voice guidance circuit through the interface circuit to the telephone line; a pager call circuit; and a controlling means for control-ling the recording means, the voice guidance means, the voice switching means and the pager call circuit according to an output from the tone detection circuit.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
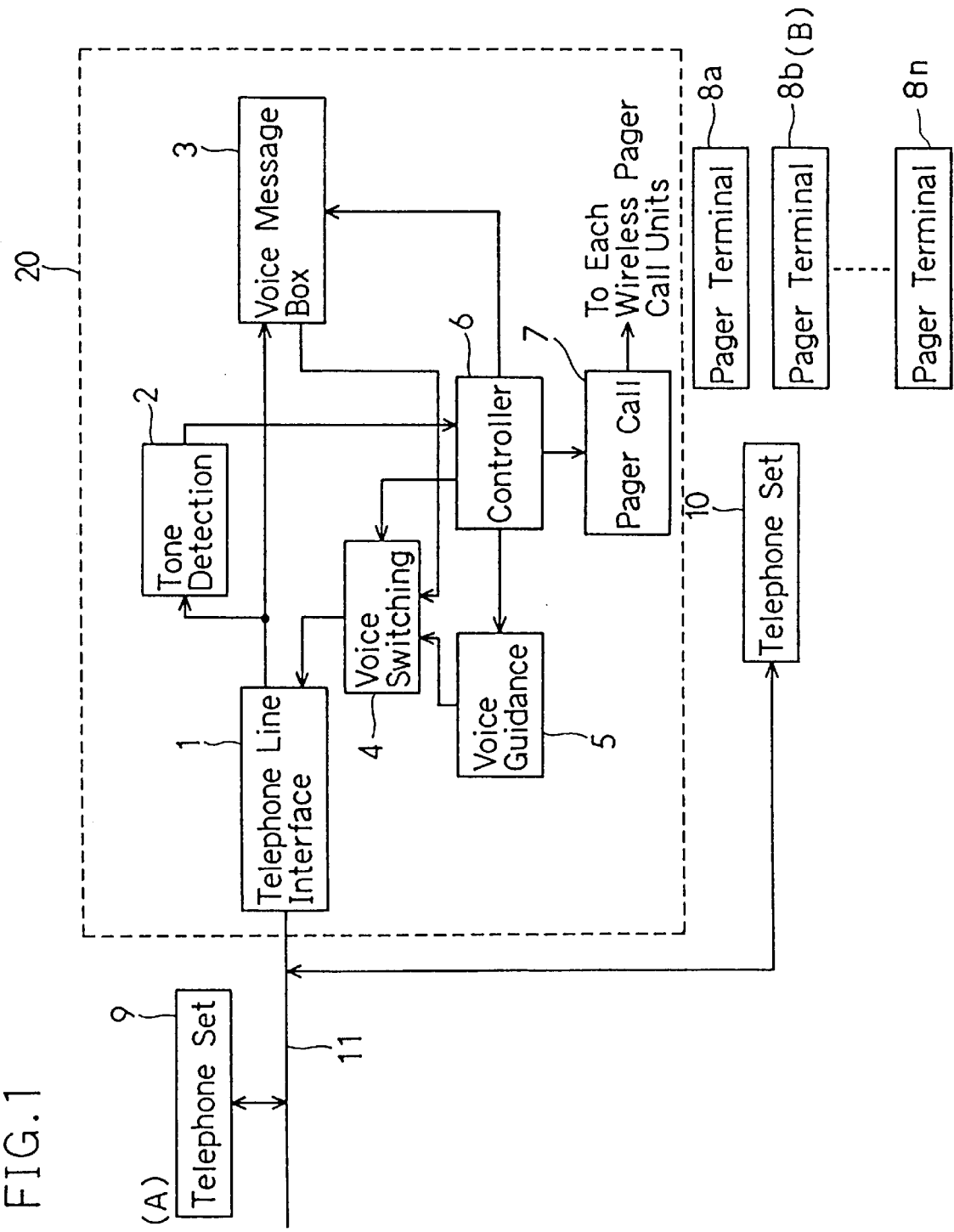
FIG. 1 is a block diagram showing a relay apparatus of the present invention.

With reference to the drawings, the construction and the workings of a relay apparatus of the present invention will be described below. FIG. 1 is a block diagram showing a construction of a relay apparatus 20 embodying the present invention. In the figure, reference numeral 1 represents a telephone line interface, reference numeral 2 represents a tone detection circuit, reference numeral 3 represents a voice message box, reference numeral 4 represents a voice switching circuit, reference numeral 5 represents a voice guidance circuit, reference numeral 6 represents a controller comprising a microcomputer, reference numeral 7 represents a pager call circuit, reference numerals 8a to 8n represent pager terminals, and reference numerals 9 and 10 are telephone sets.

The telephone line interface 1 interfaces the relay apparatus with a telephone line 11 in order to answer and originate telephone calls. It is to be noted that, when a connection between the relay apparatus 20 and the telephone line 11 is established in response to dialing of a telephone number at the telephone set, the relay apparatus 20 enters into a state for receiving a command. In this case, commands such as a recording command, a replaying command, a pager calling command and a quitting command are available. These commands are generated by predetermined key operations at the telephone set 9 or 10. An output from the telephone line interface 1 is delivered to the tone detection circuit 2, which detects a tone generated by the telephone set 9 or 10 in order to recognize contents of the tone. When the contents of the tone is a command instructing recording of a voice message, the controller 6 sends an instruction for recording to the voice message box 3, so that a voice message is stored in the voice message box 3 through the telephone line interface 1.

In case of a command for calling up a pager terminal, the controller 6 performs control for calling up the pager terminal by wireless through the pager call circuit 7. In case of a command for replaying a recorded message, the controller 6 sends an instruction to the voice message box 3 and to the voice guidance circuit 5, and controls the voice switching circuit 4 to select between the two.

In the voice guidance circuit 5, messages as to manners of receiving messages and the number of stored messages are stored in the form of voice data. The above-described processing is controlled by the controller 6 according to a command coming from the tone detection circuit 2. Here, a "tone" denotes a sequence of dual-tone beeps as is sounded by a telephone set.

Figure 2:
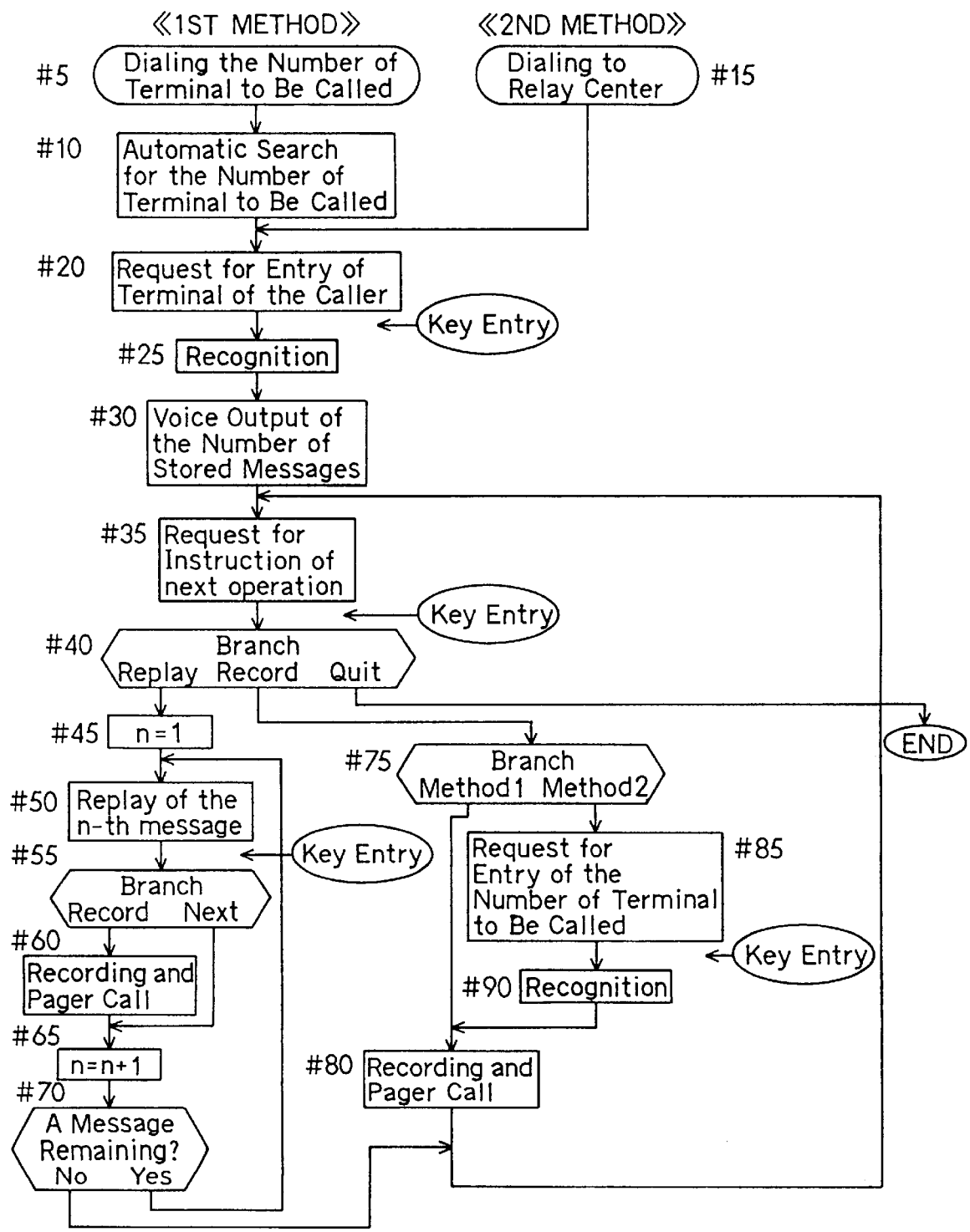
FIG. 2 is a flow chart showing the operation of a relay apparatus of the present invention.

The operation of a relay apparatus 20 of the present invention as constructed above will be described below, referring to a flow chart of FIG. 2. There are two methods for accessing a message relay center provided with a relay apparatus 11 as shown in FIG. 1: by directly dialing a number of a pager terminal to be called (the first access method), or by originating a call directly to the message relay center (the second access method).

First, according to the first access method, a user directly dials a terminal number of a terminal to be called, in step #5. The terminal number is then searched for among a plurality of terminal numbers stored beforehand in the controller 6 to recognize which pager terminal is to be accessed, in step #10. In contrast, according to the second method, steps #5 and #10 can be omitted, because the user directly dials to the message relay center.

Next, the controller 6 requests the user to enter a terminal number of the terminal originating a call, in step #20. When "A" intends to call "B", for example, the terminal number of "A" should be entered through a numerical keypad of the telephone 9. The terminal number of "A" is transferred from the telephone line interface 1 through the tone detection circuit 2 to the controller 6, and, if the controller 6 recognizes the number, in step #25, the controller 6 activates the voice guidance circuit 5 to output by voice the number of messages stored for "A" (messages stored in an address corresponding to the terminal number of "A"), in step #30.

Next, the controller 6 controls the voice guidance circuit 5 to request that the user enters an instruction for a next operation, in step #35, and then the user is requested to select among recording, replaying and quitting, in step #40. If quitting is selected through the keypad, the operation is terminated. If replaying is selected, a count value n is set to 1, in step #45, and a message corresponding to the message number n (assume n=1 here) is replayed, in step #50.

Next, depending on an operation of the keypad, a selection is made, in step #55, between recording of an answer message to the nth message, and replaying of a next message. If recording is selected, recording is performed, and an instruction is given to the pager call circuit 7 in order to call up a pager terminal of a person addressed ("B" here), in step #60. The operation then jumps to step #65.

If replaying without recording is selected, the message number n is incremented by 1, in step 65. Then, the process proceeds to step #70 to determine whether or not there remain any messages. If there remains a message, the operation returns to step #50 and the sequence from step #50 to step #70 is repeated. If there remain no messages, the operation returns to step #35, and the user is requested to enter an instruction for a next operation.

If "A" selects recording here, and then selects the first access method in step #75, a message is recorded, and a pager of the person addressed ("B" here) is called up. The process then returns to #35 and, thereafter, the sequence from step #35 to step #80 is repeated.

In contrast, if "A" selects the second access method, the user is requested to enter a pager terminal number of the person addressed, in step #85. When the number entered through the keypad is recognized, in step #90, the process jumps to step #80, and recording of a message and calling up of the pager terminal are performed. The sequence from step #35 to step #90 is then repeated until quitting is selected through the keypad.

Referring to FIG. 1, the above described operation will be summarized below. When "A" at a telephone set 9 intends to call up "B" carrying a pager terminal 8b, "A" first sends a signal from the telephone set 9 to a tone detection circuit 2 though a telephone line interface 1, in order to call up the pager terminal 8a by a pager call circuit 7 with the help of a controller 6. Next, "B", using a telephone set 10, makes an access to a relay center according to the first or the second access method. Then, "B" performs a procedure that "B" intends following the flow chart, FIG. 2. If the procedure intended by "B" is replaying of a message from "A", "B" can listen to the message stored in a voice message box 3 in the relay center through the telephone line interface 1, as illustrated in FIG. 2. It is to be assumed that "A" has stored a voice message in the voice message box 3 beforehand.

As seen from above, the present invention has the following advantages. Since "B", who is addressed to, can complete all necessary operations in a single dialing session as shown in the flow chart FIG. 2, it is possible to save time and charges. On the other hand, since "A" can complete recording and calling of a pager terminal in a single dialing session, it is possible to reduce the total number of dialing sessions to two, one session less as against a conventional method. In other words, a relay apparatus of the present invention, for storing in a message box a message sent from a sender to a specified pager terminal by way of a telephone line and at the same time calling up the pager terminal, and for forwarding the stored voice message to a telephone set afterwards when a request for reception of the voice message is received from a person called up by way of the telephone line, is provided with means for storing information on the number of voice messages addressed to the specified pager terminal, and is characterized in that the information on the number is of voice message sent prior to voice messages addressed to the pager terminal when voice messages are delivered to the pager terminal. Consequently, a relay apparatus of the present invention contributes for saving time and charges.

Further, a relay apparatus of the present invention is characterized in that information on the manner of receiving a voice message is sent to the telephone set that has made the request for reception, and in that a plurality of voice messages are sent successively. Consequently, a relay apparatus of the present invention contributes for saving time and charges.

What is claimed is:

1. A relay apparatus for pagers, comprising:
   an interface means for interfacing with a telephone line;
   a tone detection means, connected to the interface means, for determining a tone input through the interface means;
   a recording means, connected to the interface means, for recording a voice message input through the interface means by a telephone caller;
   a voice guidance means for storing a number of messages stored in the recording means and for outputting the number of messages by voice;
   a voice switching means, connected to the voice guidance means, the interface means, and the recording means, for outputting alternatively either an output from the recording means or an output from the voice guidance means through the interface means to the telephone line;
   a pager call circuit; and
   a controlling means, connected to the tone detection means, the recording means, the voice switching means, the voice guidance means and the pager call circuit, for controlling the recording means, the voice guidance means, the voice switching means and the pager call circuit according to an output from the tone detection means.

2. A relay apparatus for pagers as claimed in claim 1, wherein said controlling means, on recognizing a terminal number of a pager terminal of a caller that has accessed the relay apparatus through the telephone line, controls said voice guidance means to output by voice the number of stored messages corresponding to the terminal number, and controls the voice switching means to send out the voice through the interface means to the telephone line.

3. A relay apparatus for pagers as claimed in claim 2, wherein said controlling means, after sending out the number of messages by voice, controls the voice guidance means to output by voice a request for instruction of a next operation.

4. A relay apparatus for pagers as claimed in claim 3, wherein said controlling means controls the recording means to replay a recorded message in response to a request of the caller for replaying, and controls the recording means to record a message of the caller in response to a request of the caller for recording.

5. A relay apparatus for pagers as claimed in claim 4, wherein said controlling means, on receiving a recording command from the caller, controls the recording means to record the message and controls the pager call circuit to call up a pager terminal of a person addressed.

6. A relay apparatus, comprising:

a telephone line interface connected with a telephone line;

a tone detection means, connected to said telephone line interface, for determining a tone input through said telephone line interface;

a storage means, connected to said telephone line interface, for storing a voice message input through said telephone line interface by a telephone caller;

a voice guidance means for managing a number of voice messages addressed to a pager terminal corresponding to the tone detected by said tone detection means and for managing the manner of receiving the voice messages;

a pager call circuit;

a voice switching means, connected to said storage means, said voice guidance means and said telephone line interface, for providing either an output from said storage means or an output from said voice guidance means to said telephone line interface; and a controller means, connected to said tone detection means, said voice switching means, said storage means, said voice guidance means and said pager call circuit, for controlling said storage means, said voice guidance circuit, said voice switching circuit and said pager call circuit, wherein said controller means operates so that an output of said voice guidance means and an output of said storage means are successively provided to a telephone set through said telephone line interface when a request for reception of a stored message is received from said telephone line through said telephone line interface.

* * * * *